R. POPE.
SHOCK ABSORBER.
APPLICATION FILED JAN. 11, 1912.
1,045,076.
Patented Nov. 19, 1912.
2 SHEETS—SHEET 1.
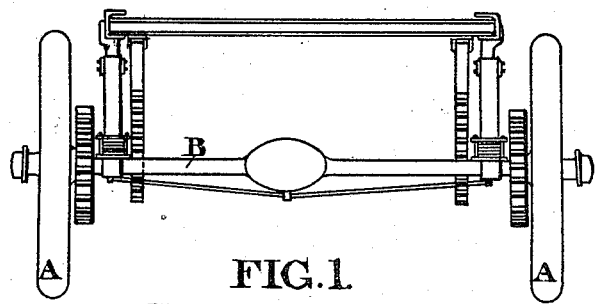
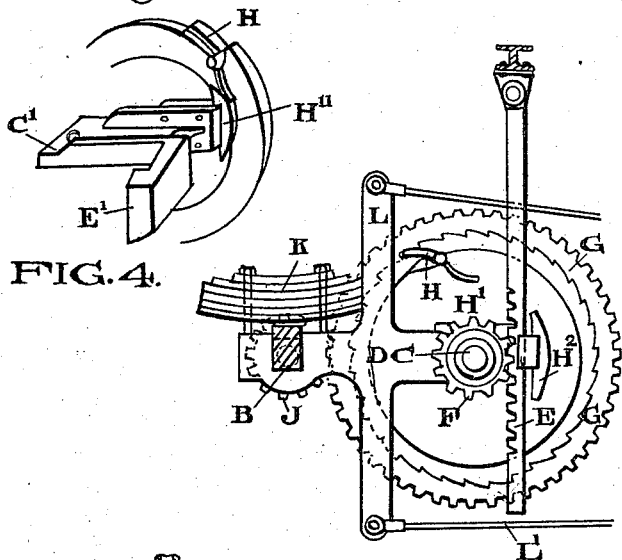
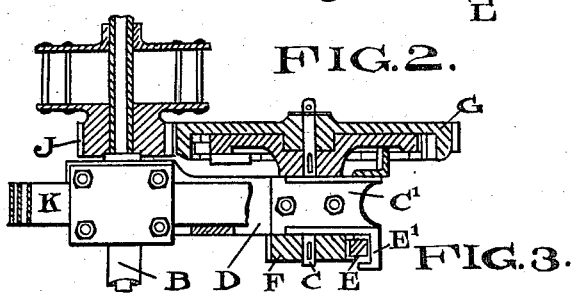
Witnesses
Inventor
Richard Pope

R. POPE.
SHOCK ABSORBER.
APPLICATION FILED JAN. 11, 1912.

1,045,076.

Patented Nov. 19, 1912.

2 SHEETS—SHEET 2.

UNITED STATES PATENT OFFICE.

RICHARD POPE, OF BRISBANE, QUEENSLAND, AUSTRALIA.

SHOCK-ABSORBER.

1,045,076.  Specification of Letters Patent.  Patented Nov. 19, 1912.

Application filed January 11, 1912. Serial No. 670,638.

*To all whom it may concern:*

Be it known that I, RICHARD POPE, a subject of the King of Great Britain, formerly of Carella, via Stonehenge, in the State of Queensland, Commonwealth of Australia, but at present care of Charles E. Bernays, 45 Adelaide street, Brisbane, in the State of Queensland, aforesaid, station manager, have invented certain new and useful Improvements in Shock-Absorbers; and I do hereby declare the following to be a full, clear, and exact description of the invention, such as will enable others skilled in the art to which it appertains to make and use the same.

My invention relates to means for absorbing the shock or jolt that occurs when a motor-car in traveling comes suddenly on an irregularity in the road. When such occurs the springs must either force the wheels down, as in the case of a rut; or are forced up on meeting an obstruction such as a patch in the road; in both cases the worst of the shock is caused by the violent re-action of the springs, which leads to breakdowns of the parts and discomfort of the occupants. After carefully studying the problem and experimenting I have found that if the re-action of the springs can be retarded the violence of the jolt is greatly reduced. To attain this desirable end I have devised means whereby on the first shock moving the springs they are prevented from immediate re-action by mechanism so arranged that only the forward movement of the car can gradually allow the springs to recover their normal position. This is done by means of a toothed rack gearing into a pinion on a countershaft carrying a spur-wheel that is geared to a pinion on the rear live axle; either pinion can be arranged to drive only in one direction and be free in the other; a ratchet wheel may be placed on the counter-shaft and drive the spur-wheel by means of pawls on the latter.

Figures 5, 7:
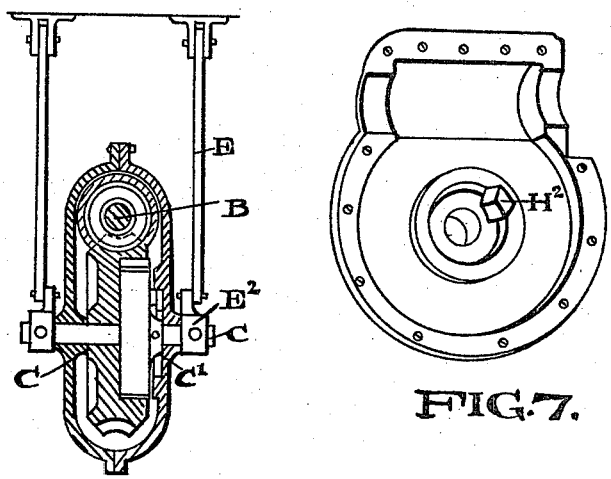
Figure 6:
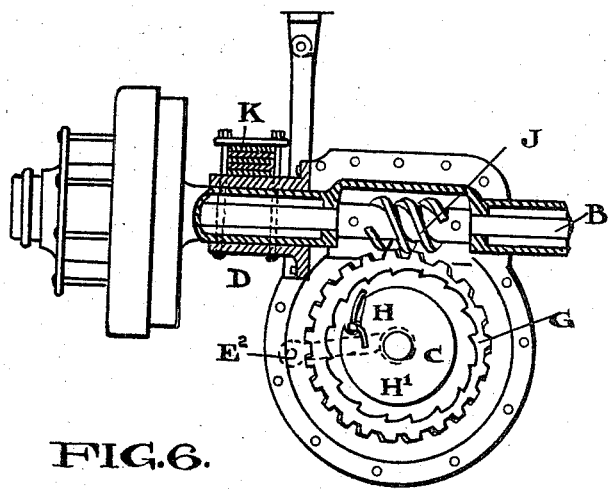

In order however that my invention may be thoroughly understood I will now describe it with reference to the accompanying drawings in which, Figure 1 shows my invention fitted to the back axle (rear view) of a motor car with the body removed. Fig. 2 is a side elevation of the gear in its simplest form with wheel removed. Fig. 3 is a part sectional plan of Fig. 2, showing method of attachment to car and of wheel hub. Fig. 4 is a perspective view showing means for releasing the pawl to enable the car to move backward. Fig. 5 is the same device with a worm and worm wheel incased, substituted for the pinion and spur wheel, and operated by levers instead of rack and pinion. Fig. 6 is a longitudinal section through worm and worm wheel and showing connections to the car body, and the casing. Fig. 7 is an inside view of casing showing the snug that permits of the car moving backward.

A A are the rear road wheels of the car; B the rear live axle.

C is a short countershaft running in the bushing C' on the extended frame D.

E is a rack secured to the underside of the car body and capable of moving vertically in the guide E'. This rack meshes with the pinion F which is keyed on the countershaft C, while the spur-wheel G which has ordinary teeth on its periphery gearing into a pinion J on the live axle, and on the inside rim has ratchet teeth, runs free, except when the pawl H carried on the disk H' engages the ratchet teeth.

K is the ordinary spring.

L are arms extending upwardly and downwardly from the extended frame, while tension rods L' lead forward therefrom to a point on the body of the car to assist to steady the mechanism when in operation.

The device illustrated in Figs. 5, 6, and 7 is practically the same, the rods E (Fig. 5) corresponding with the rack E (Fig. 2) imparting through the levers E² motion to the small countershaft C carrying the disk H' with pawl H which engages at times with the ratchet teeth in the worm wheel G, the latter meshing with the worm J on the live axle.

The operation of my absorber is as follows:—On one or both car wheels dropping into a rut the spring relieved of some of its load instantly responds and follows the wheel down, then on the wheel striking the edge and on rising out of the rut it is violently forced up or compressed so that the car body is brought near to the axle and the rack E causes the pinion F and with it the shaft C and disk H' to rotate correspondingly, then when the rack has reached its limit due to the shock, and the spring would try to recover, the pawl H at once engages the nearest tooth and prevents the violent re-action of the springs so arresting any sudden upward movement of the car body and allowing it to take place gently, and only as the car moves forward. The movement just described will be repeated at any rut or obstacle in the road, but to enable the car to move backward it is necessary to throw the pawl H out of gear and this is done by giving the pawl a tail and providing a wiper H² so curved that on the tail of the pawl coming in contact with it, it is moved out of engagement with the teeth of the ratchet wheel which is then free to revolve as the car goes backward. An illustration of the action is shown in Fig. 4. In the worm and worm-wheel construction the same function is performed by the lug H² on the casing (Fig. 7).

While no casing is shown around the gearing illustrated in Figs. 1 to 4 it can readily be fitted.

Although in the drawings an absorber is shown near each rear wheel it will be obvious that with some constructions one absorber might be used to take the shock of either or both wheels and on either or both axles.

While the car is running on an even road the absorber device is running idle ready for immediate action.

Having now particularly described and ascertained the nature of my said invention, and in what manner the same is to be performed, I declare that what I claim is:—

1. In a shock absorber for wheeled vehicles, the combination of intermeshing pinions connected to be driven from the vehicle axle; a suitable support; a countershaft journaled in said support; a pinion on said countershaft; a rack secured to the vehicle body and adapted to actuate said countershaft through said pinion; and a pawl and ratchet mechanism disposed between said intermeshing pinions and the rack and pinion gearing, substantially as described.

2. In a shock absorber for wheeled vehicles, the combination of a pair of intermeshing pinions connected to be driven from the vehicle axle; one of said pinions being provided with a rack; a suitable support; a countershaft journaled in said support; a pinion secured to rotate with said countershaft; a rack bar connected with the vehicle body and operable to actuate said countershaft through said pinion; a disk secured to rotate with said countershaft; and a pawl carried by said disk and adapted to engage with said pinion rack, substantially as described.

3. In a shock absorber for wheeled vehicles, the combination of a suitable support; a pinion journaled on said support, said pinion being provided with a rack; a second intermeshing and relatively smaller pinion mounted on and adapted to be driven by the vehicle axle; a countershaft journaled in said support; a pinion mounted to rotate with said countershaft; a rack bar meshing with said pinion and connected to be actuated from the vehicle body; a disk mounted to rotate with said countershaft; a pawl mounted on said disk and adapted to engage with the rack of the first-named pinion; and means for holding said pawl out of engaging position during the rearward movement of the vehicle, substantially as described.

In testimony whereof, I affix my signature, in presence of two witnesses.

RICHD. POPE.

Witnesses:
W. I. DAVIS,
M. J. CANDRECK.

---

Copies of this patent may be obtained for five cents each, by addressing the "Commissioner of Patents, Washington, D. C."